US012780540B2

(12) United States Patent
Garola et al.

(10) Patent No.: US 12,780,540 B2
(45) Date of Patent: Nov. 3, 2026

(54) AUTOMATED WAREHOUSE WITH FOUR-WAY VEHICLE

(71) Applicant: EUROFORK S.P.A., Roletto (IT)

(72) Inventors: Alessandro Garola, Cavour (IT); Maurizio Traversa, Turin (IT)

(73) Assignee: EUROFORK S.P.A., Roletto (IT)

( * ) Notice: Subject to any disclaimer, the term of this patent is extended or adjusted under 35 U.S.C. 154(b) by 321 days.

(21) Appl. No.: 18/617,688

(22) Filed: Mar. 27, 2024

(65) Prior Publication Data

US 2024/0327120 A1 Oct. 3, 2024

(30) Foreign Application Priority Data

Mar. 28, 2023 (IT) ........................ 102023000005928

(51) Int. Cl.
*G05D 1/244* (2024.01)
*B65G 1/04* (2006.01)

(52) U.S. Cl.
CPC .... *B65G 1/0492* (2013.01); *B65G 2203/0283* (2013.01); *B65G 2203/044* (2013.01)

(58) Field of Classification Search
CPC .......... B65G 1/0492; B65G 2203/0283; B65G 2203/044; B65G 1/065; B65G 1/137; B65G 1/04; B65G 1/1371; B65G 1/1375; G05D 1/244; G05D 2107/70
See application file for complete search history.

(56) References Cited

U.S. PATENT DOCUMENTS

2016/0137418 A1 5/2016 Traversa et al.
2020/0399060 A1 12/2020 Whelan et al.

FOREIGN PATENT DOCUMENTS

DE 102015001410 A1 * 8/2016 ........... B65G 1/0492
WO WO-2014195867 A1 * 12/2014 ........... B65G 1/0492
WO 2015/011575 A1 1/2015
WO 2020/062208 A1 4/2020

OTHER PUBLICATIONS

Italian Search Report for Patent Application No. IT 202300005928, mailed Sep. 15, 2023, The Hague, NL.

* cited by examiner

*Primary Examiner* — Justin Holmes
(74) *Attorney, Agent, or Firm* — Valauskas Corder LLC

(57) ABSTRACT

An automated warehouse having pairs of parallel first rails and pairs of parallel second rails, perpendicular to the first rails, and one or more four-way vehicles is provided. Along the first and second rails are arranged respective optically readable representations of position data that univocally identify the absolute positions of points, within the automated warehouse, and along the first and second rails, where the optically readable representations of position data are placed. A first optical reader and a second optical reader are mounted on board the four-way vehicle. The first and second optical readers are configured to read the first and second optically readable representations of position data, respectively, along respective first and second rails perpendicular to each other.

13 Claims, 3 Drawing Sheets

AUTOMATED WAREHOUSE WITH FOUR-WAY VEHICLE

CROSS-REFERENCE TO RELATED APPLICATION

This application claims priority to Italian Patent Application No. 102023000005928 filed Mar. 28, 2023, the entire contents of which is hereby incorporated in its entirety by reference.

FIELD OF THE INVENTION

The present invention relates to an automated warehouse with a system for handling cargo units by means of four-way vehicles moving on a perpendicular track system.

BACKGROUND ART

Automated warehouses are known with systems for handling cargo units by means of remotely controlled vehicles, referred to as shuttles and satellites, as disclosed in patent publication WO 2015/011575 A1. An automated warehouse of the above-mentioned type comprises at least one main path and a plurality of secondary side paths, perpendicular to the main path, along which storage locations suitable for receiving cargo units are defined. The cargo units are moved by two types of vehicles: a first main self-propelled vehicle (called a "shuttle" or, alternatively, a stacker crane), and a second auxiliary self-propelled vehicle (called "satellite"), which can be transported by the first vehicle. The shuttle moves along the main path, carrying the satellite. Once the shuttle has reached the secondary path where the location where a cargo unit is to be deposited or picked up is located, the satellite leaves the shuttle and, moving along the secondary path, can deposit or pick up a cargo unit.

Location data representations in the form of bar codes or data matrices (two-dimensional matrix barcodes) are applied along the main and secondary paths, which univocally identify the absolute positions of reference points or intervals along the paths within the automated warehouse. Representations in the form of bar codes or data matrices are readable by vehicle-mounted optical readers.

The use of such data representations improves the accuracy with which the correct positioning of vehicles within the warehouse can be controlled, overcoming the limitations associated with traditional position feedback systems, generally based on "encoder" type transducers. These systems involve an encoder that detects the rotation of the vehicles wheels, converting the number of revolutions recorded into a linear length, calculated incrementally, with respect to a previously determined reference point. Wheel wear contributes to a decrease in the reliability of current positioning control solutions. The data made available by an encoder that detects the rotation of the vehicles' wheels, converting the number of recorded revolutions into a linear length, are affected by the wear of the wheels, as the conversion algorithm continues to operate on the basis of values that do not correspond to reality. Vibrations or slippage of the wheels can also affect the accuracy of the expected location of the vehicle. In addition, uncertainties and positioning errors may occur due to temporary power failures, or as a result of manual vehicle movements, which may occur during servicing, without controlling the movement via the vehicle's propulsion system.

Automated warehouses in which vehicles known as "four-way shuttles" operate are known in the art and described, for example, in patent publication WO 2020/062208 A1. Each vehicle is capable of picking up and placing a cargo unit by moving along tracks extending in two perpendicular horizontal directions. The perpendicular track system comprises a first set of pairs of parallel rails arranged in a first direction, and a second set of pairs of parallel rails arranged in a second direction perpendicular to the first direction. A four-way vehicle consists of a single unit having the capacity to move in two orthogonal directions by means of two sets of wheels perpendicular to each other, one set of which is temporarily brought into contact with a pair of rails of the first set, while the second set of wheels is raised and not in contact with the rails of the second set, to move the vehicle in the first direction. To move the vehicle in the second direction, the wheels of the first set are raised and disengaged from the rails of the first set, and the wheels of the second set are lowered to engage a pair of rails of the second set.

SUMMARY OF THE INVENTION

It is an object of the present invention to provide an automated warehouse in which one or more vehicles of the "four-way" type operate, equipped with an absolute positioning system, i.e. one that detects absolute position data (and not distances), where such data are based on an external, fixed, vehicle-independent reference system.

The above and other objects and advantages are achieved, according to an aspect of the present invention, by an automated warehouse as described and claimed herein. Preferred embodiments of the automated warehouse are also described.

In summary, an automated warehouse includes a plurality of pairs of parallel first rails arranged in a first horizontal direction, and a plurality of pairs of parallel second rails arranged in a second direction, perpendicular to the first direction, wherein the rails have respective first and second upwardly facing raceways. The warehouse comprises at least one four-way vehicle suitable for carrying cargo units along the first and second rails and is equipped with a first set of wheels, arranged along two first opposite sides of the vehicle, and a second set of wheels, arranged along two second opposite sides of the vehicle, perpendicular to the first sides. The wheels of at least one of the first and second sets of wheels are raised and lowered relative to the other set of wheels to selectively engage the wheels of the first set of wheels with the raceways of a pair of rails of the first plurality of pairs of rails, and simultaneously disengage the wheels of the second set of wheels from the raceways of the second plurality of pairs of rails, and vice versa. At least one rail in the pairs of first rails has an inner face facing the other of the two rails of the same pair. Adjacent to and along said inner face in the pairs of first raceways, there is arranged a first optically readable representation of position data which unambiguously identifies absolute positions of points, within the automated warehouse and along the pairs of first rails wherein each of said first representations of position data is located. A second optically readable representation of position data, which univocally identifies absolute positions of points, within the automated warehouse and along the pairs of second rails wherein each of said second representations of position data is located, is arranged adjacent to and along the second rails in the pairs of second rails. First and second optical readers, mounted on board each vehicle, are configured to read respectively the first and second optically readable representations of position data along respective mutually perpendicular rails. The first representations of position data are arranged lower than the first raceways on the first rails, and the second representations of position data are arranged higher than the second raceways on the second rails.

BRIEF DESCRIPTION OF THE DRAWINGS

A few preferred embodiments of an automated warehouse will now be described referring to the attached drawings, in which.

DETAILED DESCRIPTION

Figure 1:
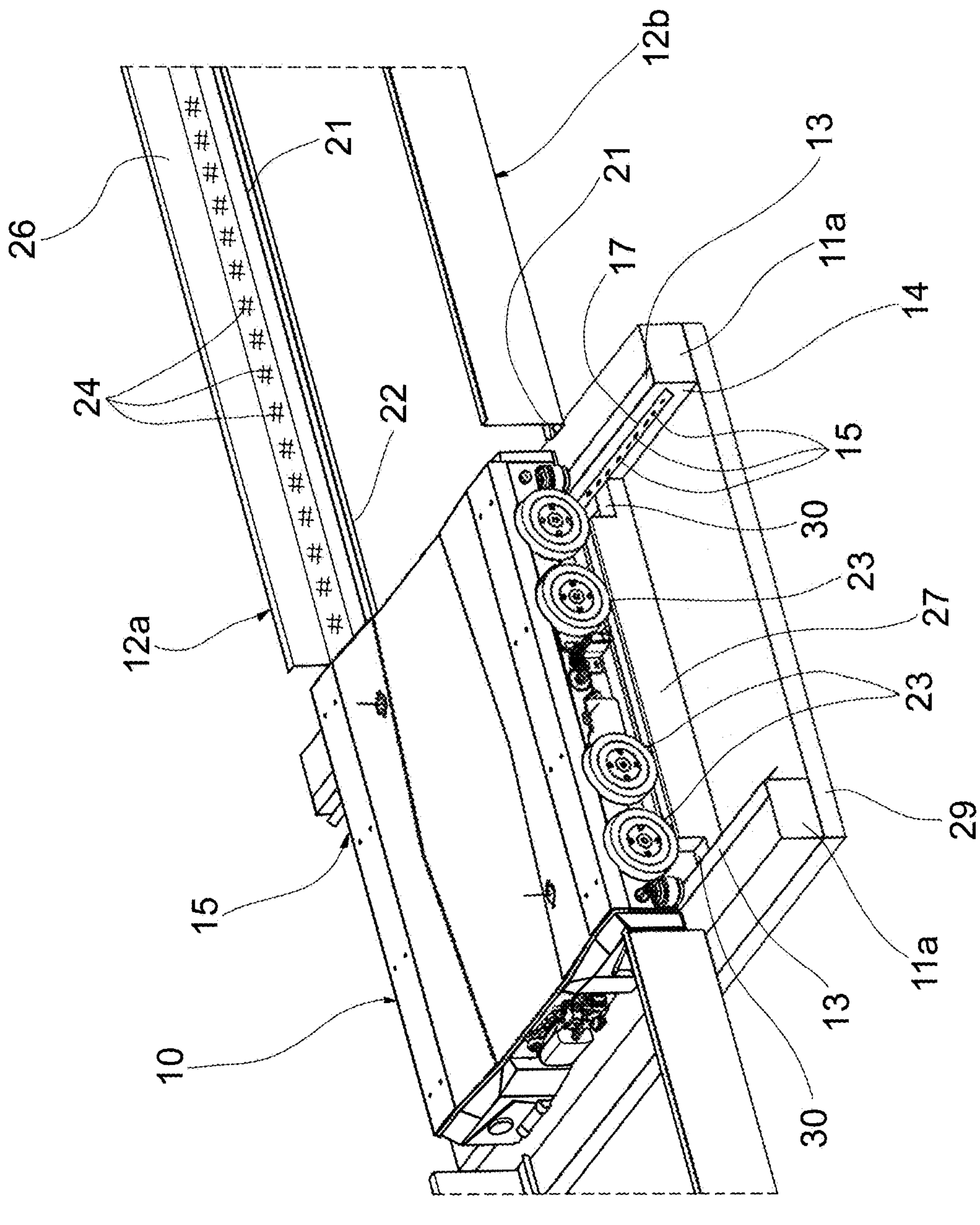
FIG. 1 is a schematic perspective view of part of an automated warehouse, with a four-way vehicle at a junction between two pairs of perpendicular rails.

With reference to the drawings, an automated warehouse comprises one or more four-way vehicles 10 and a perpendicular track system 11, 12 along which each four-way vehicle can move to pick and place cargo units by travelling along two perpendicular horizontal directions. The cargo units (not shown) may include storage containers, such as pallets or similar items.

The perpendicular track or path system comprises a plurality of pairs of parallel first rails or guides 11*a*. 11*b* arranged in a first horizontal direction, and a plurality of pairs of parallel second rails 12*a*, 12*b* or guides arranged in a second direction, perpendicular to the first direction. In the accompanying drawings, only part of a pair of first rails and second rails is visible. Storage locations (not shown), suitable for receiving cargo units, are distributed, in a per se known manner, alongside the rails, particularly of the second rails 12. Each of the first rails has a respective first horizontal upwardly facing raceway 13, on which a respective row of a pair of parallel rows of wheels 28 of the vehicle can roll.

At least one 11*b* of the two rails of the pair of first rails has a vertical or "inner" face or side 14 facing the other 11*a* of the two rails of the same pair. Arranged along the vertical face 14 of at least one of the two rails of the pair of first rails is a first optically readable representation 15 of position data, in this example in the form of bar codes or data matrices (two-dimensional matrix bar codes), which univocally identify the absolute positions of reference points or intervals along the rail within the automated warehouse, where each of the first representations 15 of position data is located. The data representations are readable by a first optical reader 16 mounted on board one of the four-way vehicles 10 in the warehouse.

According to a preferred embodiment, the first optically readable representation 15 of position data is made as a strip 17 of tape material bearing data typically represented as a bar code or data matrix. The strip 17 may be applied by means of an adhesive.

The choice of the specific type of optically readable representation is not to be considered as being limited to bar codes and data matrixes. Alternative embodiments may provide for position data to be represented in forms other than those mentioned above, as long as they are suitable for making the position data of the points where these representations are applied readable.

Preferably, the data representations are placed at a lower level than the raceway, in a position that makes the data representation less susceptible to abrasion, scratching, tearing, removal or damage by bumping or rubbing.

Embodiments may provide that, as in the shown example, the first representation 15 of position data is oriented in an oblique plane, inclined relative to a horizontal plane and a vertical plane. The inclination is advantageous in that such angular orientation reduces the deposit of dirt and dust on the face of the data representation that is to be read optically.

The inclined orientation of the first data representations can be achieved by applying a strip of tape material bearing the position data to an inclined slat formation or portion 18 attached to or adjacent to the inner face 14.

Alternative embodiments (not shown) may provide for the data representation to be oriented vertically, applied to the inner face of the rail. A vertical orientation requires an adaptation to mount the corresponding optical reader on the vehicle, so that the reader is pointed towards the data representation at a not too narrow reading angle.

Still referring to FIG. 1, each of the second rails 12*a*, 12*b* has a respective second horizontal upward-facing raceway 21 on which a respective row of a pair of parallel rows of wheels 28 of the vehicle can roll.

The second rails 12 may be made in a plurality of cross-sectional shapes, preferably by means of box sectional metal profiles, having inverted U or C or Z shapes, etc. In the shown embodiment, the rails are realised with a Z section, with a lower horizontal wing 22 having a respective second raceway 21.

Arranged adjacent to at least one of the second raceways is a second optically readable representation 24 of position data, in the form of bar codes or data matrixes (two-dimensional matrix bar codes), which univocally identify the absolute positions of reference points or intervals along the track within the automated warehouse. The second representation 24 of position data is readable by a second optical reader 25 mounted on board the four-way vehicle.

Preferably, the second representation 24 of position data associated with the second raceway 21 is placed higher up than this one.

According to a preferred embodiment, at least one of the two rails of the pair of second rails 12*a*, 12*b* has a vertical or "inner" face or slat 26 facing the other of the two rails of the same pair, and the second position data representation is applied to that inner vertical face or slat 26.

According to a preferred embodiment, in a crossing area between a pair of first rails 11 and a pair of second rails 12, a respective rectilinear connecting element 27 is provided for each of the second raceways 21. The rectilinear connecting element 27 is arranged between the pair of first rails perpendicularly to the pair of first rails. The rectilinear connecting element 27 superiorly has a second raceway section aligned and arranged as a bridge between the second rails 21 in the crossing area between a pair of first rails and a pair of second rails. As shown, the rectilinear connecting elements 27 provide a continuation of the second raceways 21 at the points where these cross the first rails.

The connecting elements may be mounted in pairs on a horizontal plate 29 bearing a pair of first rails. In order to allow uninterrupted reading of the data represented on the data representation of the first pair of rails, each connecting element has an upper recess 30 at one end thereof located adjacent to a first rail providing the first position data representation. The upper recess 30 is configured and dimensioned to allow the passage of the first representation of position data 15 and advantageously has an extension, as measured in the horizontal direction in which the connecting element extends, which allows the first optical reader 16 to be mounted in such a position that, when the vehicle 10 passes along the pair of first rails 11, the reading is not interrupted by the apex formed between the recess 30 and the highest central portion 32 of the connecting element 27.

A "four-way" vehicle comprises a single unit being able of translating in two orthogonal directions by means of two orthogonal sets of wheels 23, 28. The general arrangement of a "four-way" vehicle of the type depicted in the figures is generally known. Accordingly, only those elements of specific relevance and interest for the implementation of the present invention will be described in detail below. For the implementation of the parts and elements not shown in detail, reference may therefore be made to any known type of "four-way" vehicle.

On each vehicle 10, having a substantially rectangular shape in plan, there are two sets of wheels: a first set of wheels 23, arranged along two first opposing sides of the vehicle, are associated with a motor or drive mechanism (not shown) capable of providing propulsion energy to drive wheels of the first set in both directions of the first longitudinal direction of the first rails 11. The vehicle has a second set of wheels 28, arranged along two other second opposite sides of the vehicle, perpendicular to the first sides. The wheels of the second set are associated with a second motor or drive mechanism (not shown) capable of providing propulsion energy to drive wheels of the second set of wheels 28 in both directions of a second transverse direction, perpendicular to the first longitudinal direction.

Only one at a time, of the two sets of wheels 23, 28, can be in contact with the rails along which the vehicle is to move. The selective disengagement or engagement of each set of wheels from their respective rails is provided by means of a lifting system (not shown), mounted on board the vehicle, which can be variously configured to raise and lower one or two frames, as appropriate, to which the first and second sets of wheels are respectively mounted.

The vehicle is typically arranged, according to aspects "per se" known and not described or shown herein, to lift the cargo units to be transported. The lifting is accomplished by means of a lifting system that acts independently of the propulsion mechanisms, and which may involve lifting only a top bearing surface of the vehicle, or the entire vehicle. A power source for the vehicle may include a rechargeable electric accumulator (not shown) to ensure autonomy during operational missions.

The first 16 and the second 25 optical readers are configured to read, respectively, the data representations distributed along the rail pairs of the first 11 and second 12 sets of rails.

According to an embodiment, the first optical reader 16 for the first representations of position data 15 is mounted inside the vehicle, close to one side of the vehicle where the first set of wheels is mounted for movement along the first rails.

Figure 2:
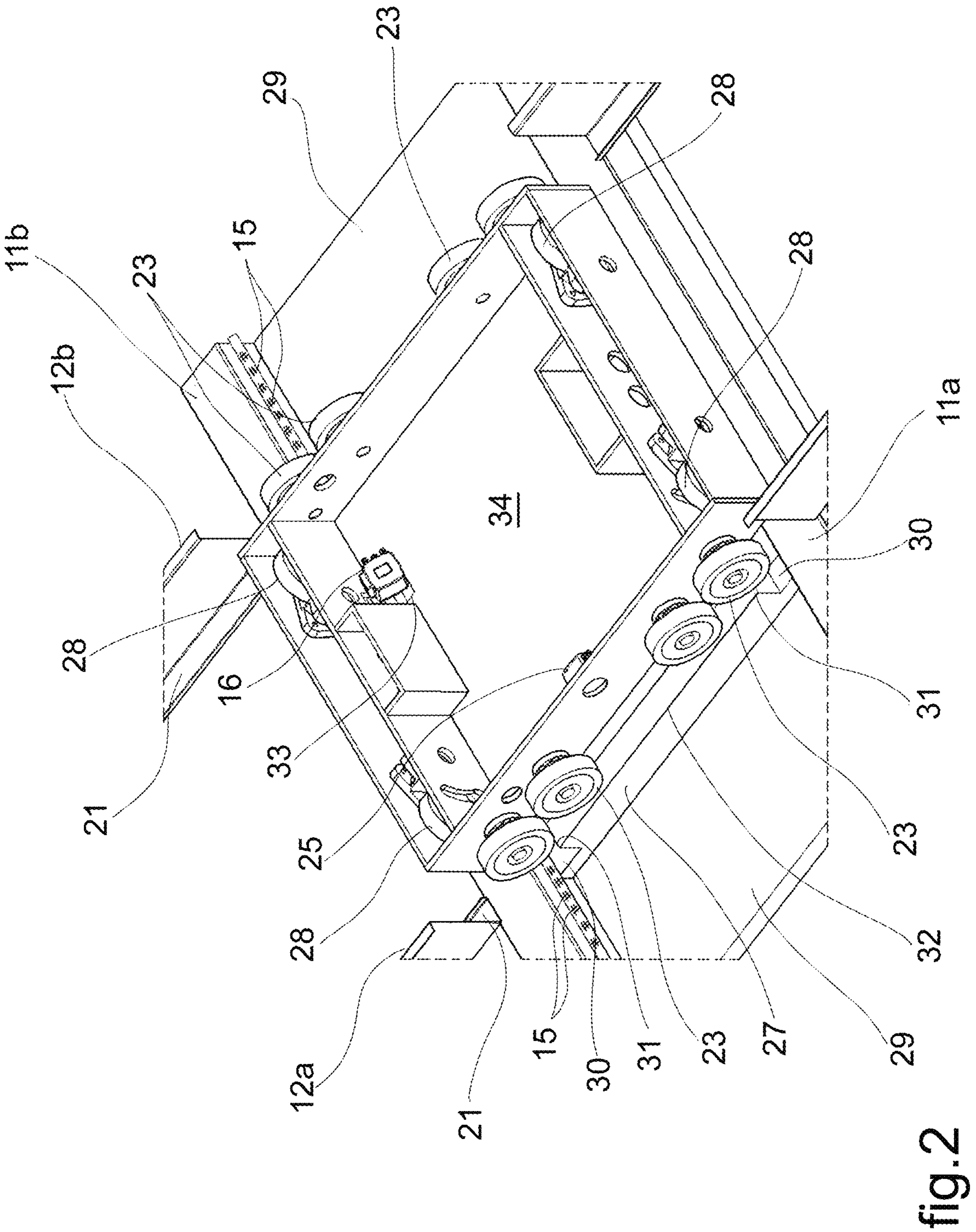
FIGS. 2 and 3 are respectively a perspective view and a top view of the warehouse part of FIG. 1, where some elements have been removed for illustrative purposes.
Figure 3:
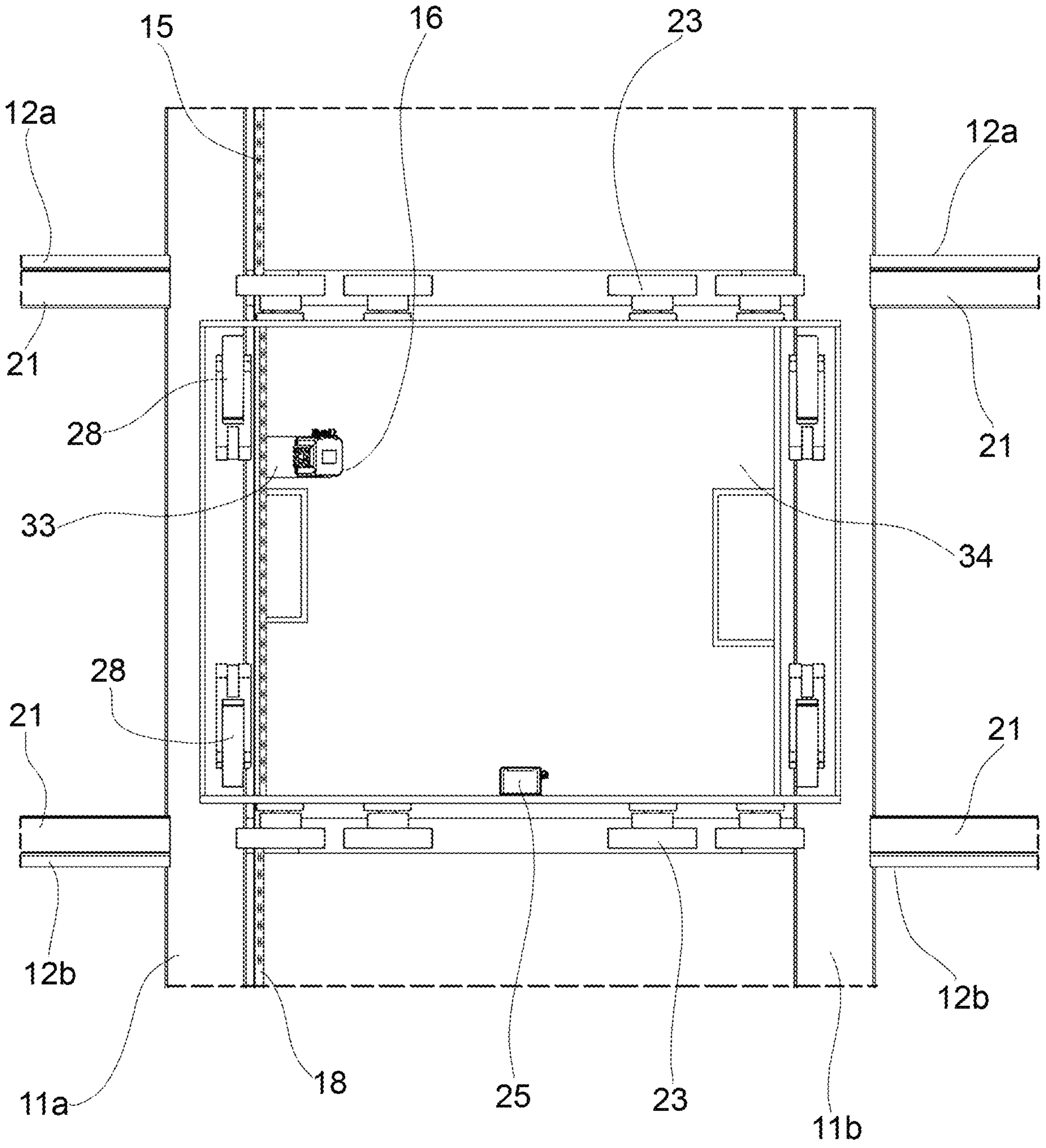

In the example shown in FIGS. 2 and 3, in order to facilitate a reading in a direction as perpendicular as possible to the lying plane of the data representation, a through opening 33 is formed in a lateral position in a lower floor 34 of the vehicle.

In the shown embodiment, the second optical reader 25 for the second representations of position data is mounted laterally on one side of the vehicle, on the side of the second set of wheels for movement along the second rails.

The specific technology of optical sensors may vary depending on the requirements and future developments of this technology. For example, optical readers with photodiode-associated light sources, laser light sources, LED barcode light sources, Charged Coupled Device (CCD) sensors, camera-type image reading systems, large field-of-view readers using high-resolution cameras able of simultaneously capturing information from a multiplicity of barcodes, etc. may be used. As an example, optical reading heads model PCV100-F200-B17-VID-6011-8203, marketed by the company Pepperl+Fuchs FA Italia S.r.l., may be used.

The position data collected by the optical readers on board of the vehicle allow a mapping of the warehouse. The position data recorded in real time by the optical sensors on a vehicle may be transmitted from an on-board data transmission unit to a central warehouse data reception, processing and transmission unit, which allows the movement of each individual vehicle to be monitored and the paths of the various moving vehicles to be coordinated in order to optimise the cycle times for picking up and delivery of cargo units between a delivery and picking location and the multiplicity of storage locations in the warehouse.

Various aspects and embodiments of the automated warehouse have been described. It is understood that each embodiment may be combined with any other embodiment. Furthermore, the invention is not limited to the described embodiments, but may be varied within the scope defined by the appended claims.

What is claimed is:

1. An automated warehouse, comprising:

a perpendicular rail system comprising a plurality of pairs of parallel first rails arranged in a first horizontal direction, and a plurality of pairs of parallel second rails arranged in a second direction, perpendicular to the first direction, wherein said first and second rails provide respective first and second upwardly facing raceways;

at least one four-way vehicle for transporting cargo units along said first and second rails, with a first set of wheels, arranged along two first opposite sides of the four-way vehicle, and with a second set of wheels, arranged along two second opposite sides of the four-way vehicle, perpendicular to said first sides, wherein the wheels of at least one of the first and second sets of wheels are liftable and lowerable relative to the other set of wheels, to selectively engage the wheels of the first set of wheels with the raceways of a pair of rails of the plurality of pairs of first rails, and simultaneously disengage the wheels of the second set of wheels from the raceways of the plurality of pairs of second rails, and vice versa; wherein at least one rail in the pairs of first rails has an inner face facing the other rail of a same pair of first rails;

a first optically readable representation of position data is arranged adjacent to and along said inner face in the pairs of first rails, univocally identifying absolute positions of points, within the automated warehouse and along the pairs of first rails, where each of said first optically readable representations of position data is located;

a second optically readable representation of position data is arranged adjacent to and along the second raceways of at least one rail in the pairs of second rails, where each of said second optically readable representations of position data is located, univocally identifying the absolute positions of points, within the automated warehouse and along the pairs of second rails, where each of said second optically readable representations of position data is located;

a first optical reader and a second optical reader, mounted on board the at least one four-way vehicle, are configured to read respectively the first and second optically readable representations of position data along respective first and second rails perpendicular to one another, and wherein the first optically readable representations of position data are arranged lower than the first raceways on the first rails, and the second optically readable representations of position data are arranged higher than the second raceways on the second rails.

2. The automated warehouse of claim 1, wherein at least some of the first optically readable representations of position data are oriented in oblique planes, inclined with respect to a horizontal plane and respective vertical planes, wherein each oblique plane is oriented upwards and towards the first rail opposite the rail having the inner face adjacent to which the respective first optically readable representation of position data is arranged.

3. The automated warehouse of claim 2, wherein said inclined orientation of the first optically readable representations of position data is obtained by applying a strip of tape material bearing the first optically readable representations of position data on an inclined strip formation or portion, adjacent to said inner face of the first rail.

4. The automated warehouse of claim 1, wherein at least some of the first optically readable representations of position data are applied to said inner face, said inner face being vertically oriented and facing the other rail of the same pair of first rails.

5. The automated warehouse of claim 1, wherein the second optically readable representations of position data are arranged on a vertical inner face of one of the two rails of the pair of second rails, and wherein said vertical inner face is oriented towards the other of the two rails of a same pair of second rails.

6. The automated warehouse of claim 1, wherein the first optical reader for the first optically readable representations of position data is mounted internally in the four-way vehicle, adjacent a side of the four-way vehicle where the first set of wheels for moving the four-way vehicle along the first rails is mounted.

7. The automated warehouse of claim 6, wherein the four-way vehicle comprises a lower floor having a through opening in a lateral position below the first optical reader.

8. The automated warehouse of claim 1, wherein the second optical reader for the second optically readable representations of position data is mounted laterally on the four-way vehicle, at one side where wheels of the second set of wheels for moving the four-way vehicle along the second rails are arranged.

9. The automated warehouse of claim 1, wherein at each crossing area between a pair of first rails and a pair of second rails, for each of the second raceways a rectilinear connecting element is arranged between the pair of first rails perpendicularly thereto, and wherein each connecting element provides a length of second raceway aligned with and bridging the second rails in the crossing area between the pair of first rails and the pair of second rails, so that the connecting elements provide a continuation of the second raceways at the points where the second raceways cross the first rails.

10. The automated warehouse of claim 9, wherein the connecting elements are mounted in pairs on a horizontal plate suitable for supporting a pair of first rails.

11. The automated warehouse of claim 9, wherein each connecting element has an upper recess at one end thereof located adjacent to a first rail having the first optically readable representation of position data, said upper recess being configured to allow to the first optical reader an uninterrupted reading of the first optically readable representation of position data on the pair of first rails.

12. The automated warehouse of claim 1, wherein the first and second optically readable representations of position data comprise data represented as bar codes or as data matrix.

13. The automated warehouse of claim 1, wherein the first and second optically readable representations of position data comprise data represented on strips of tape material applied by adhesive to the first and second rails.

* * * * *